No. 715,690. Patented Dec. 9, 1902.
M. W. POMRANING.
POTATO BUG DESTROYER.
(Application filed Feb. 18, 1902.)
(No Model.) 2 Sheets—Sheet 1.
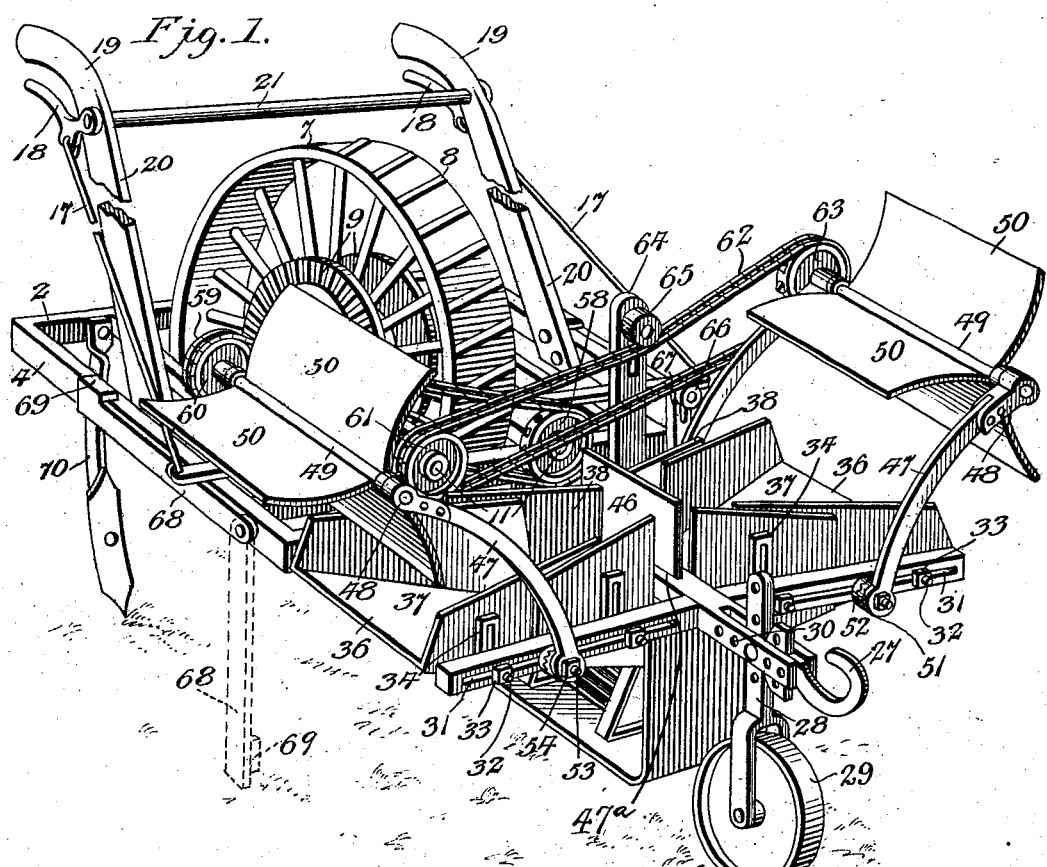
Witnesses
Edwin T. McKee
Chas. S. Hyer
Inventor
Max W. Pomraning
By Victor J. Evans
Attorney
THE NORRIS PETERS CO., PHOTO-LITHO., WASHINGTON, D. C.

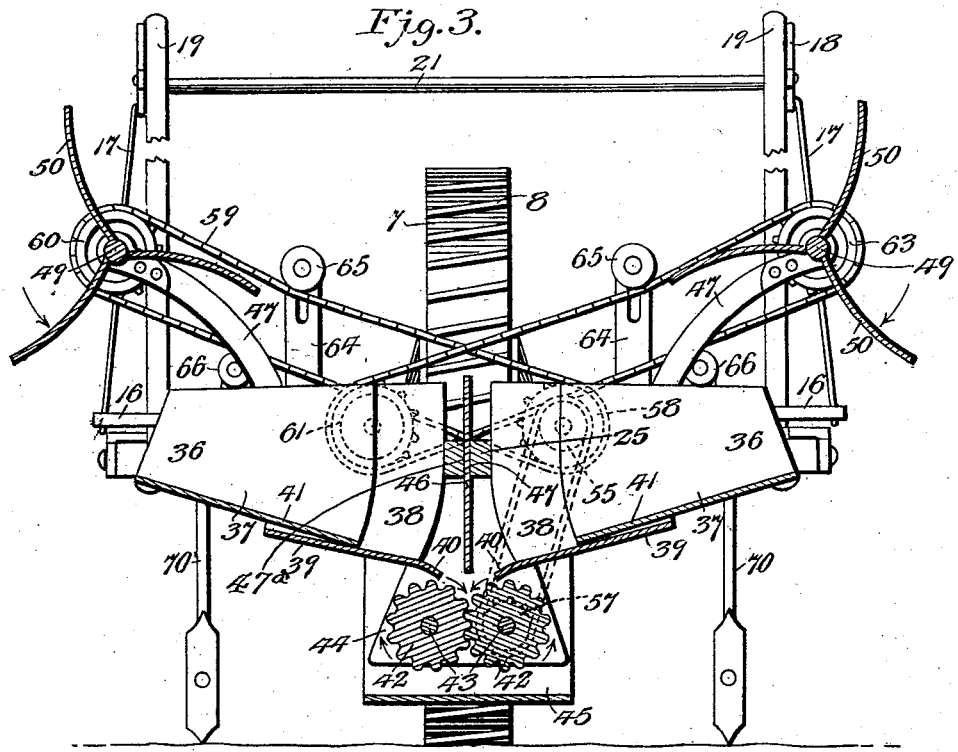
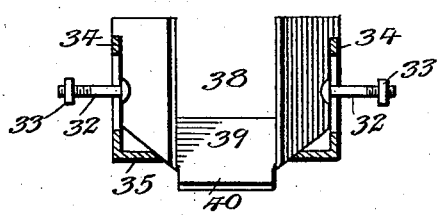
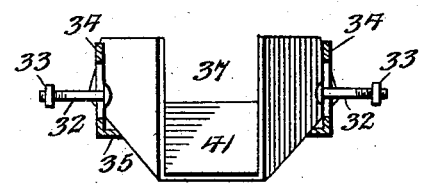
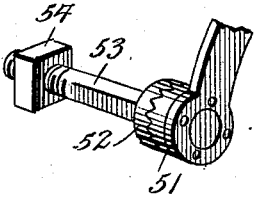
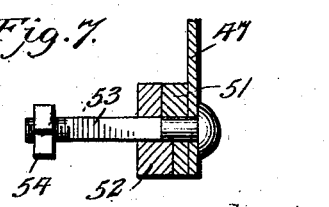

UNITED STATES PATENT OFFICE.

MAX W. POMRANING, OF PARKE, PENNSYLVANIA.

POTATO-BUG DESTROYER.

SPECIFICATION forming part of Letters Patent No. 715,690, dated December 9, 1902.

Application filed February 18, 1902. Serial No. 94,610. (No model.)

*To all whom it may concern:*

Be it known that I, MAX W. POMRANING, a citizen of the United States, residing at Parke, in the county of York and State of Pennsylvania, have invented certain new and useful Improvements in Potato-Bug Destroyers, of which the following is a specification.

This invention relates to a machine for destroying potato-bugs, and in its operation is propelled between the rows of potato-plants and knocks the bugs from the plants inwardly into the machine, where they are destroyed.

The present machine is adapted for use with double or single rows of potato-plants, and can be made to practically operate with the rows which are irregularly planted or crooked, and embodies features of adjustment whereby the variations in the height of the plants may be accommodated and the bugs thrown into the machine during different steps of growth.

A further object of the present construction is that the machine may be used either singly or doubly, and variations in the distance between rows may be accommodated easily.

The invention also contemplates the embodiment in the organization of the machine of means for reliably destroying the bugs and preferably in the form of inwardly-rotating crushing or grinding rolls, between which the bugs are delivered from one or both sides of the machine, and thereby avoid the inconvenience arising from the use of tanks containing poisonous materials and other imperfect methods heretofore commonly employed, though it will be understood that in some instances a tank containing a poisonous liquid may be substituted for the rolls.

The improved machine also embodies means of support which may be thrown into use during adjustment, all parts of the machine to balance the latter, and also has cultivating or shovel attachments which will loosen up the ground in rear of the parts in contact with the ground-surface, so that the trenches between the rows will not become hardened or packed down.

The improved machine also embodies positively-operating driving mechanism having clutch devices, whereby a part or all of the same may be thrown out of operative relation to the main driving-wheel.

In the drawings, Figure 1 is a perspective view of a machine embodying the features of the invention. Fig. 2 is a top plan view of the same. Fig. 3 is a transverse vertical section through the forward part of the machine and illustrating the relative positions of the grinding or crushing rolls, the adjustable chutes, and the beaters. Figs. 4 and 5 are detail views, in sectional elevation, of portions of the chutes and the adjusting-yokes. Fig. 6 is a detail perspective view of the means for adjustably supporting the beater-arms. Fig. 7 is a longitudinal vertical section of the device as shown by Fig. 6.

Similar numerals of reference are employed to indicate corresponding parts in the several views.

The machine will be constructed of such dimensions as to permit it to be readily and easily propelled between rows of potato-plants, and all the parts will be of a strong and durable nature and as light as the desired wearing qualifications and necessary resistance to be set up will permit. Such materials will be employed in the construction of the several parts as are best adapted for the purpose, and in some instances wood and metal combined or either one of these materials alone will be used in the formation of the several members.

The numeral 1 designates a main frame consisting of front and rear cross-bars 2 and 3, forming a part of or secured to the outer side bars 4, and at a suitable distance inwardly from said side bars are longitudinal bars 5, having a space between them of a suitable width. A shaft 6 is terminally mounted in suitable bearings carried by the longitudinal bars 5, and thereon is a large ground-wheel 7 with traction-ribs 8. Secured to the ground-wheel 7 are opposite bevel-gears 9, with which bevel-pinions 10 are adapted to mesh, the said pinions being loosely mounted on the rear ends of a pair of longitudinally-disposed shafts 11, held in bracket-bearings 12, projected inwardly from the forward extremities of the longitudinal bars 5. The forward ends of the pinions 10 are provided with clutch members 13, and slidably mounted and splined to the shafts 11 in any suitable manner are clutch-sleeves 14 to coöperate with the clutch members 13 and held in normal engagement with the latter by springs 15, surrounding the shafts 11 between the portions of the bearings 12 engaged by said shaft and front ends of the clutch-sleeves. The clutch-sleeves 14 are engaged by the inner extremities of shifting-levers 16, extending outwardly in transverse directions and fulcrumed on the longitudinal bars 5. Secured to the outer ends of the shifting-lever 16 are connecting-rods 17, which extend upwardly and rearwardly at an angle of inclination to gripping-dogs 18, pivotally mounted adjacent to the grips or handholds 19, formed at the upper extremities of handles 20, extending downwardly and secured to the side bars 4 and connected, as usual, by a rod 21, which may have the gripping-dogs pivotally secured on the opposite terminals thereof. It will be seen that the shifting-lever 16 may be operated to throw either one or both of the clutch-sleeves out of engagement with the clutch members 13 of the pinions 10, and thereby stop the rotation of either one or both of the shafts 11.

The side bars 4 are projected beyond the front cross-bar 3 and connected to the rear cross-bar 22 of a front frame 23, embodying a front cross-bar 24 and a central longitudinally-extending bar 25, which is projected beyond the front cross-bar 24 a suitable distance and longitudinally slotted, as at 26, to adjustably receive a clevis 27 and the post 28 of a colter-wheel 29, the said forwardly-projected portion of the bar 25 being formed with a plurality of openings 30, and the post 28 and rear extremity of the clevis 27 have corresponding openings to coincide with the openings 30, the said parts being connected in their adjusted positions by means of suitable bolts or pins passed transversely through the front extremity of the bar 25 and the post 28 and rear extremity of the clevis.

It will be understood that the adjustment of the clevis and the post 28 will respectively regulate the draft and the elevation of the front extremity of the machine relatively to the ground-surface over which it moves.

The front and rear cross-bars 22 and 24 of the frame 23 are formed with longitudinal slots 31, extending therethrough in horizontal planes, and are adjustably engaged by bolts 32, provided with clamping-nuts 33, the said bolts extending from the upright members 34 of yoke-brackets 35. The yoke-brackets 35 support adjustable or telescopic chutes 36, arranged on opposite sides of the longitudinal bar 25, each chute comprising a pair of chute-sections 37 and 38, the section 37 having its inner extremity movably fitted in the outer extremity of the section 38. The chute-sections 37 and 38, forming the complete chute organization on each side of the bar 25, are vertically adjustable simultaneously through the medium of the upright members 34 of the yoke-brackets 35, this adjustment being obtained by loosening the nuts 33 and raising or lowering the pairs of chute-sections and afterward tightening the nuts to maintain the said sections at the elevation desired. As shown, the upright members 34 of the yoke-brackets 35 project upwardly over opposite sides of the chute-sections and permit a vertical adjustment which for all ordinary purposes is sufficient; but when operating the machine in relation to very high growths of potato-plants it may be found necessary to increase this vertical adjustment or to permit the chute-sections to be lowered below the plane permitted by the slots in the vertical or upright members 34 of the yoke-brackets. By inverting the yoke-brackets so that the upright members will depend below the bottoms of the chutes the machine will be adapted to operate with plants of very small growth or having a height at a comparatively low elevation above the ground-surface. The chutes comprising the sections on opposite sides of the bar 25 are inclined inwardly and downwardly from their outer extremities, and the inner chute-sections 38 have the bottoms 39 projected inwardly beyond the inner ends of the sides and curved downwardly to form directing-lips 40, as clearly shown by Fig. 3. The bottoms 41 of the outer chute-sections rest upon and overlap the bottoms 39 of the inner chute-sections and prevent the bugs which are knocked or thrown into the chute-sections from crawling backwardly between the sections. The lips 40 of the bottoms 39 of the inner chute-sections are directed toward the intermeshing portions of crushing or grinding rolls 42, mounted on suitable shafts 43, having bearing at opposite extremities in depending end plates 44, which also serve as guards to prevent the bugs from being thrown out endwise after their deposit upon the rolls, and surrounding the plates 44 and the rolls 42 is a fender 45, which extends longitudinally of and depends below the frame 23 a suitable distance, the said fender being closed at the front and rear and at the bottom and open at opposite ends, so that the bugs after passing through and becoming crushed by the rolls will be deposited on the bottom of the fender and gradually pushed out sidewise onto the ground-surface in view of the fact that the rolls rotate inwardly toward each other and will operate to push outwardly any accumulations of the crushed bugs thereunder. The rolls are effective in their operation in view of the fact that the corrugations thereof closely intermesh similar to the teeth of gears, and the bottom of the fender is far enough below the plane of the rolls to permit the crushed bugs to fall thereon and be pushed outwardly at opposite sides without interfering with or in the least affecting the operation of the rolls. The chutes are separated by a slide-plate 46, vertically adjustable in a slot 47$^a$ in the longitudinal bar 25, this slide-plate also preventing the bugs knocked or thrown into one chute from passing over into the opposite chute and causing the bugs which are thrown thereagainst to fall directly between the rolls below. This slide-plate 46 will be adjusted proportionately to the vertical adjustment of the chutes on opposite sides of the longitudinal bar 25.

The front and rear bars 22 and 24 of the frame 23 also adjustably support outwardly-curved beater-supporting arms 47, having bearings 48 at their upper ends, in which are journaled the opposite extremities of beater-shafts 49, to which are secured a series of concavo-convex beater-blades 50 so disposed as to bring their convex faces in contact with the potato-plants to avoid breaking or injuring the branches of the latter. These beaters, comprising the shafts 49 and beater-blades 50, are disposed at a suitable elevation above the outer extremities of the opposite chutes and are rapidly rotated by means which will be hereinafter explained. The lower ends of the arms 47 are formed with ratchet-heads 51, which are centrally apertured and are adapted to interlock with ratchet members 52, carried on bolts 53, which pass through said heads and are engaged by clamping-nuts 54. The bolts 53 are constructed as clearly shown by Fig. 6 and have the portions thereof which extend through the slots 31 in the front and rear bars 24 and 22 squared or angular in cross-section to prevent said bolts from turning in the slots, and in this connection it will be also understood that the bolts 32, which engage the upright members 34 of the yoke-brackets 35, will also be similarly squared throughout that portion thereof which passes through the slots 31. The bolts 53, like the bolts 32, are adjustable longitudinally of the front and rear bars 24 and 22 to dispose the beaters in proper relation to the chutes when the latter are extended outwardly from opposite sides of the machine, and, furthermore, the said arms 47 may be raised or lowered through the medium of the ratchet-heads 51 and ratchet members 52 to accommodate the elevation and depression of the chutes when the machine is adjusted to accommodate potato-plants of different heights or growths.

The beaters and rolls 42 are operated through the medium of the shafts 11, the one shaft 11 having a sprocket-wheel 55 thereon close to the front edge of the front cross-bar of the frame 1, which is engaged by a chain belt 56, running down to and surrounding a sprocket-wheel 57 on the one shaft 43 of one of the rolls 42, as clearly shown by Fig. 3. The shaft 11, having a sprocket-wheel 55 thereon, also has a second sprocket-wheel 58 thereon in advance of the sprocket-wheel 55, which is engaged by a chain belt 59, extending outward and upward in a transverse direction and surrounds a sprocket-wheel 60 on the rear end of one of the beater-shafts 49. The other shaft 11 is projected forwardly a greater distance than that which carries the sprocket-wheels 55 and 58 and has on its front end a sprocket-wheel 61, surrounded by a chain belt 62, which also extends upwardly and outwardly and engages a sprocket-wheel 63 on the rear end of the beater-shaft 49 opposite that carrying the sprocket-wheel 60. In other words, the chain belts are so disposed and arranged as to cause the beaters to rotate inwardly, and thereby effectively knock or throw the potato-bugs into the chutes. To tighten the belts 59 and 62, opposite uprights 64 are secured to the front cross-bar 3 of the frame 1 and have belt-tightening rollers 65 adjustably mounted in the upper extremities thereof and which are held in continual engagement with the upper portions of the said chain belts. The lower portions of the said chain belts are also engaged by combined guide and belt-tightening rollers 66, adjustably carried in the upper extremities of shorter uprights 67, secured to the front cross-bar 3 outside of the uprights 64, and through the medium of these belt-tightening and guide rollers lost motion in the chain belts is obviated. It will be seen that either one or both of the shafts may be caused to cease its operation by the operation of either one or both of the shifting-levers 16, and if it is desired to hold either one of the shafts 11 in inoperative condition the gripping-dog 18, controlling the clutch mechanism thereof, may be held up against the grip or handhold 19 adjacent thereto by any suitable means.

The machine is adapted to be used in connection with adjacent rows of potato-plants and operate on both rows at the same time to knock the bugs therefrom into the chutes, or one row may be treated solely in a similar manner. In other words, it is not necessary that both beaters be actuated when it is desired that only one is to operate, and thus adapt the machine for effective work in connection with an outside single odd row or with an irregularly-planted or crooked middle row that does not run parallel with an adjacent row. If desired, the machine may have the chutes and beater at one side removed when it is only required that one row be operated on, or, as before explained, the beaters and chutes may always remain intact with the machine and be thrown out of operation by the adjustment of the clutch mechanism in connection with the shafts 11.

In changing the adjustment or otherwise manipulating the parts it is necessary that a balancing means be provided or a support to hold the machine in stable position and prevent it from falling over, particularly when the mechanism is removed at one side and the machine is adapted for use with a single row only. For this purpose hinged legs 68 are pivotally attached to the opposite side bars 4 of the frame 1, one leg on each bar, the said legs having sufficient resiliency to cause them to spring up close to the side bars when elevated, and to hold the legs properly elevated on the side bars when not in use and resist the vibrations which would tend to cause them to fall, the rear terminal of each leg is formed with an angular extension 69 to bear on the upper edge of the side bar 4. When the legs are down, either one or both, the machine will be balanced and the several parts adjusted without liability of the entire machine falling over and injuring the adjacent plants.

Another important feature in connection with the present machine is the application thereto of a series of cultivators 70, which may be of any preferred form and number. These cultivators are located in rear of the plane of the ground-wheel 7 and operate to loosen up the ground in the trenches between the rows of plants and overcome any tendency to packing down said trenches by the movement of the machine therethrough.

In the operation of the machine it is propelled through or in the trenches between the rows of potato-plants, and the beaters rotating inwardly after a suitable adjustment has been made knock or throw the bugs into the chutes, and from the latter the said bugs fall in between the rolls 42 and become crushed, the residuum falling from the rolls to the bottom 45 of the fender and from the latter is pushed outwardly into the trenches and a greater portion thereof covered by the rear cultivators. By this means potato-plants can be rapidly and reliably freed of potato-bugs and the latter immediately destroyed and without the use of poisonous substances, which often has such a serious effect on small stock. Furthermore, a large area can be covered by the use of the machine within a comparatively small time, and potato-plants can be more frequently treated and freed of potato-bugs than by the old methods.

Having thus fully described the invention, what is claimed as new is—

1. In a machine of the class set forth, the combination with crushing-rolls, of opposite chutes mounted in adjustable relation to said rolls and having upwardly-projecting side members which movably overlap, and beaters adjustable in relation to the chutes.

2. In a machine of the class set forth, the combination of crushing-rolls, a chute adjustable vertically and laterally in relation to the rolls, reversible yoke devices for holding the said chute, means for securing the yokes in adjustable position, and a beater adjustable vertically and laterally in relation to the chute.

3. In a machine of the class set forth, the combination of crushing-rolls, chutes composed of telescopical sections having upwardly-projecting side flanges and adjustable vertically and laterally, reversible yokes for holding said chutes, means for securing the yokes in adjustable position, a sliding plate vertically movable between the inner extremities of the chutes, and beaters coöperating with the said chutes.

4. In a machine of the class set forth, the combination of crushing-rolls, opposite chutes having their inner extremities disposed over the rolls and comprising chute-sections telescopically arranged in relation to each other and also vertically adjustable, and beaters mounted over the outer extremities of the chutes and having means for vertically and laterally adjusting the same.

5. In a machine of the class set forth, the combination of crushing-rolls, a fender below the rolls open at opposite sides, adjustable chutes above the rolls, and beaters adjustably mounted in relation to the outer extremities of the chutes.

6. In a machine of the class set forth, the combination of crushing-rolls, a fender below the rolls open at opposite sides, oppositely-disposed chutes having their inner extremities disposed over the rows, a slide-plate vertically movable through the inner extremities of the chutes, beaters disposed over the outer extremities of the chutes and having concavo-convex blades, the said beaters having an inward rotation, and means for operating the rolls and beaters.

7. In a machine of the class set forth, the combination of means for destroying potato-bugs, oppositely-disposed chutes leading to said means, beaters arranged over the outer extremities of the chutes, both of the chutes or beaters being removable from the machine and also adjustable, and supporting-legs movably attached to the machine in rear of the chutes and beaters.

In testimony whereof I affix my signature in presence of two witnesses.

MAX W. POMRANING.

Witnesses:
JOHN FERTNER,
GEORGE M. BOND.